United States Patent
Marshall

(10) Patent No.: US 7,190,091 B1
(45) Date of Patent: Mar. 13, 2007

(54) SELECTABLE SOURCE INPUT POWER SUPPLY

(75) Inventor: Robert A. Marshall, Georgetown, TX (US)

(73) Assignee: Cisco Technology, Inc., San Jose, CA (US)

( * ) Notice: Subject to any disclaimer, the term of this patent is extended or adjusted under 35 U.S.C. 154(b) by 397 days.

(21) Appl. No.: 10/742,223

(22) Filed: Dec. 19, 2003

(51) Int. Cl.
*H02J 3/00* (2006.01)
*H02J 1/00* (2006.01)
*H02B 1/24* (2006.01)

(52) U.S. Cl. ............................ 307/26; 307/22; 307/72; 307/80; 307/128

(58) Field of Classification Search .................. 307/22, 307/26, 72, 80, 128
See application file for complete search history.

(56) References Cited

U.S. PATENT DOCUMENTS

| | | | | | |
|---|---|---|---|---|---|
| 1,103,693 A | * | 7/1914 | Shedd | .......................... | 318/245 |
| 2,677,798 A | * | 5/1954 | Bekey | .......................... | 318/441 |
| 4,608,498 A | * | 8/1986 | Falzarano et al. | ............. | 307/22 |
| 5,245,220 A | * | 9/1993 | Lee | .............................. | 307/80 |
| 5,631,504 A | * | 5/1997 | Adahan | ........................ | 307/72 |
| 6,134,125 A | | 10/2000 | Wenzel | ......................... | 363/37 |
| 6,297,972 B1 | * | 10/2001 | Chen | ............................ | 363/37 |
| 6,459,604 B1 | | 10/2002 | Youn et al. | .................. | 363/142 |

* cited by examiner

*Primary Examiner*—Brian Sircus
*Assistant Examiner*—Hal I. Kaplan
(74) *Attorney, Agent, or Firm*—Campbell Stephenson Ascolese LLP

(57) ABSTRACT

A selectable source input power supply is disclosed. According to one embodiment, a power supply is provided comprising an input stage including an input connector to couple the power supply to either of an AC input voltage or a DC input voltage, and an actuatable input switch to determine which of the AC input voltage and the DC input voltage is coupled to the power supply, to couple the input stage to an alternating current path in response to a determination that the AC input voltage is coupled to the power supply, and to couple the input stage to a direct current path in response to a determination that the DC input voltage is coupled to the power supply.

12 Claims, 5 Drawing Sheets

SELECTABLE SOURCE INPUT POWER SUPPLY

BACKGROUND OF THE INVENTION

1. Field of the Invention

The present invention relates generally to power supplies and more particularly to a selectable source input power supply.

2. Description of the Related Art

In the past, power supplies each included a single power supply circuit designed for a specific operating environment (e.g., available input source type, voltage, and current ranges and required output type, voltage, and current ranges) or application. More recently, power supplies including multiple power supply circuits within a single package or design, each designed for a particular operating environment or application, have been provided. FIG. 1 illustrates a power supply including multiple power supply circuits according to the prior art.

In the illustrated embodiment of FIG. 1, a power supply 100 is depicted including an alternating current (AC) source input power supply circuit 102 and a direct current (DC) source input power supply circuit 104. AC source input power supply 102 includes an AC input connector 106 and a line filter 108 within an input stage (e.g., filtered connector 110), a voltage rectifier 112, a power factor correction (PFC) sub-circuit 114, and an isolation stage including a high voltage transistor 116, a transformer 118, a rectifier 120, and a control element 122. DC source input power supply 104 of the illustrated prior art embodiment includes an DC input connector 126 and a line filter 128 within an input stage (e.g., filtered connector 124), and an isolation stage including a low voltage transistor 130, a transformer 132, a rectifier 134, and a control element 136.

In operation, AC source input power supply circuit 102 is coupled to an AC voltage source via AC input connector 106 to receive an AC voltage. The received AC voltage is then filtered using line filter 108 to attenuate electromagnetic noise included within the supplied AC voltage. The filtered AC voltage is next full-wave rectified using rectifier 112 and applied to PFC sub-circuit 114 reducing harmonic distortion and generating a ~400 VDC voltage. The DC voltage output from PFC sub-circuit 114 is then converted or transformed using high voltage transistor 116, transformer 118, control element 122 and rectifier 120 to a desired DC voltage. Similarly DC source input power supply circuit 104 in operation is coupled to a DC voltage source via DC input connector 126 to receive a DC voltage. The received DC voltage is then filtered using line filter 128 and converted or transformed using low voltage transistor 130, transformer 132, control element 136 and rectifier 134 to a desired DC voltage.

Power supplies, such as power supply 100 of FIG. 1, including multiple power supply circuits are capable of being coupled to a greater number of potential sources and consequently providing greater flexibility. Nevertheless, such power supplies suffer from a number of significant drawbacks. Duplicative components (e.g., input connectors 106 and 126, line filters 108 and 128, transformers 118 and 132, rectifiers 120 and 134, and control elements 122 and 136) significantly increases the overall cost of power supply 100 as compared to alternative single power supply circuit designs. Moreover, switching between alternative sources requires physical disconnection and downtime and damage may result to power supply circuits 102, 104 and/or load devices or circuits if a source is incorrectly coupled to power supply 100.

In an alternative power supply design, multiple input stages are coupled to shared portions of a power supply circuit. FIG. 2 illustrates a power supply including a shared portion of a power supply circuit and multiple input stages according to the prior art. In the illustrated embodiment of FIG. 2, a power supply 200 is depicted including an AC input connector 202 and a line filter 204 within a first input stage 206, and a DC input connector 208 and a line filter 210. Power supply 200 of the illustrated prior art embodiment further includes a voltage rectifier 214, a power factor correction (PFC) sub-circuit 216, and an isolation stage including a transistor 218, a transformer 220, a rectifier 222, and a control element 224.

In operation, AC voltages may be received from an AC voltage source coupled to power supply 200 via AC input connector 202 or DC voltages may be received from a DC voltage source coupled to power supply 200 via DC input connector 208. An AC voltage received by power supply 200 is filtered using line filter 204 to attenuate electromagnetic noise included within the supplied AC voltage. The filtered AC voltage is then full-wave rectified using rectifier 214 and applied to PFC sub-circuit 216, generating a DC voltage. The DC voltage output from PFC sub-circuit 216 is then converted or transformed using transistor 218, transformer 220, control element 224 and rectifier 222 to a desired DC voltage. Similarly, in operation a DC voltage received by power supply 200 is filtered using line filter 210 and converted or transformed using transistor 218, transformer 220, control element 224 and rectifier 222.

Although reducing somewhat the number of duplicate components as compared with power supplies including completely independent power supply circuits, power supplies such as power supply 200 of FIG. 2 still include a number of duplicate components (e.g., input connectors 202 and 208 and line filters 204 and 210) and must include specialized components due to their design which significantly increase overall cost. For example, transistor 218 of the prior art embodiment of FIG. 2 must be capable of operating when supplied both with high voltages frequently associated with higher voltage AC inputs and with high currents frequently associated with lower voltage DC inputs in order to operate correctly over a sufficiently wide input voltage range. Moreover, switching between alternative sources using the power supply design of FIG. 2 requires physical disconnection and downtime and damage may result to the power supply and/or load devices or circuits if a source is incorrectly coupled to power supply 200.

SUMMARY OF THE INVENTION

Disclosed is a selectable source input power supply. Embodiments of the present invention may be used to convert either of an AC or DC input voltage to a desired DC output voltage. According to one embodiment, a power supply is provided comprising an input stage including an input connector to couple the power supply to either of an AC input voltage or a DC input voltage, and an actuatable input switch to determine which of the AC input voltage and the DC input voltage is coupled to the power supply, to couple the input stage to an alternating current path in response to a determination that the AC input voltage is coupled to the power supply, and to couple the input stage to a direct current path in response to a determination that the DC input voltage is coupled to the power supply.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention has been described in connection with one or more specific embodiments, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

According to one embodiment of the present invention, a power supply is provided having an input stage including an input connector to couple the power supply to either of an AC input voltage or a DC input voltage, and an input switch to determine which of the AC input voltage and the DC input voltage is coupled to the power supply, to couple the input stage to an AC path in response to a determination that the AC input voltage is coupled to the power supply, and to couple the input stage to a DC path in response to a determination that the DC input voltage is coupled to the power supply.

Figure 1:
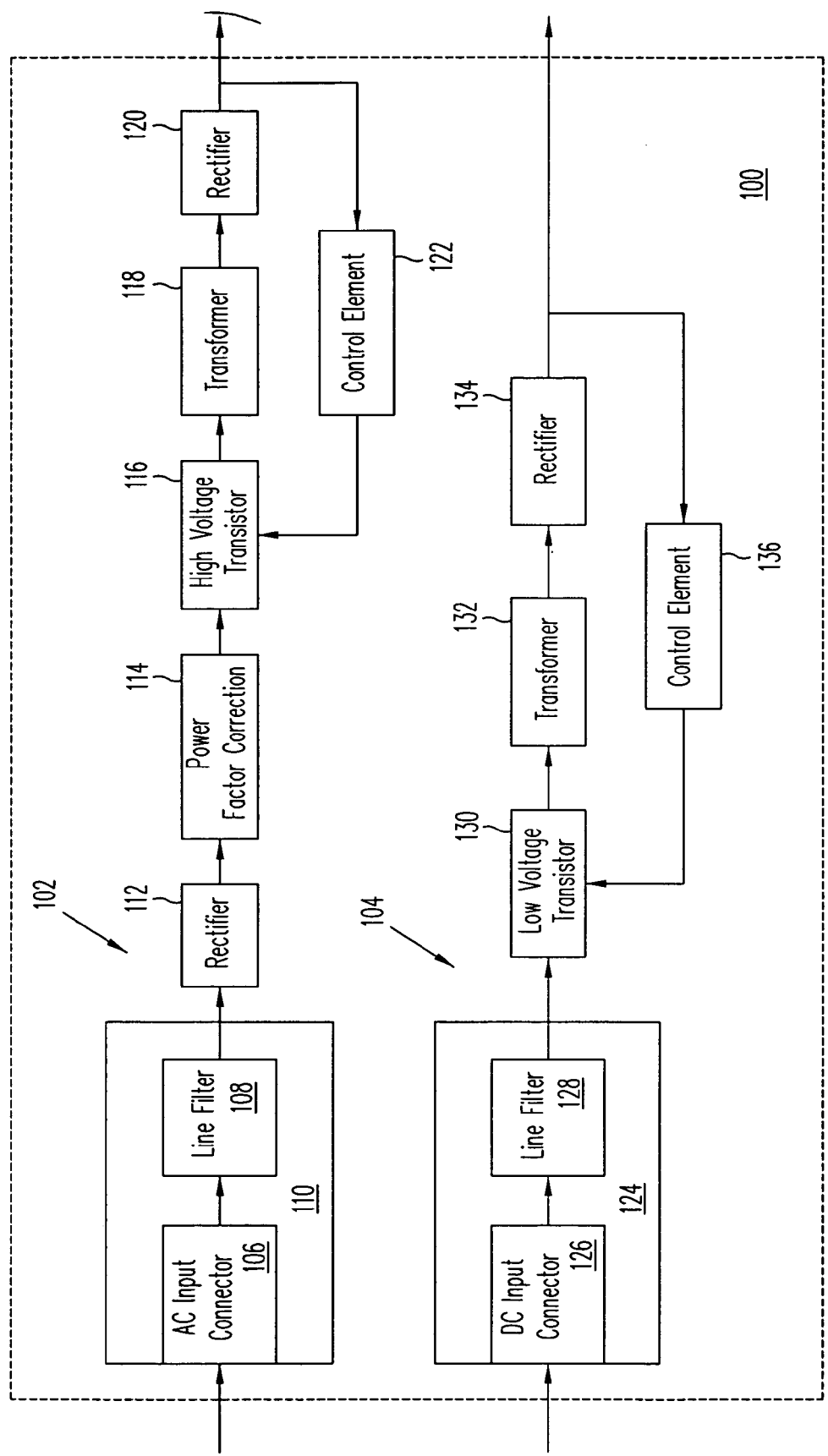
FIG. 1 illustrates a power supply including multiple power supply circuits at block level according to the prior art.
Figure 2:
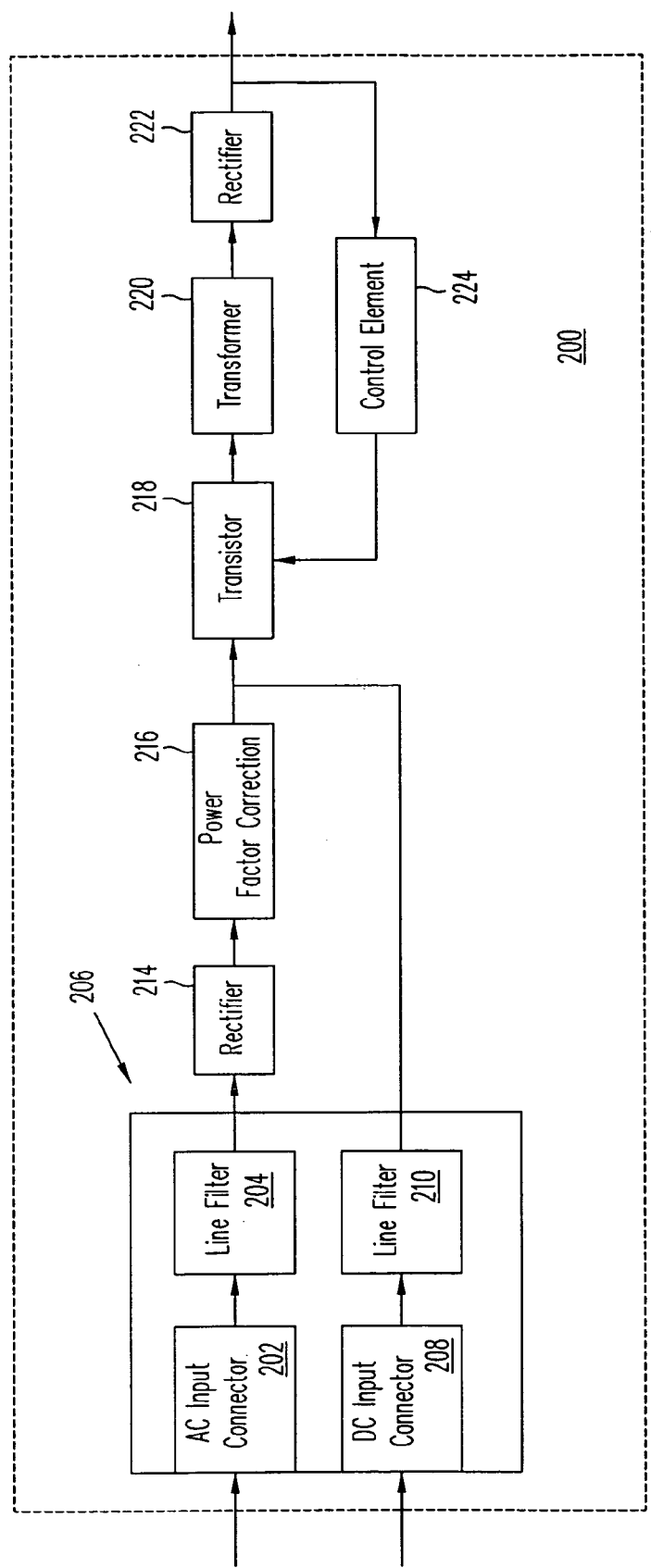
FIG. 2 illustrates a power supply including a shared portion of a power supply circuit and multiple input stages at block level according to the prior art.
Figure 3:
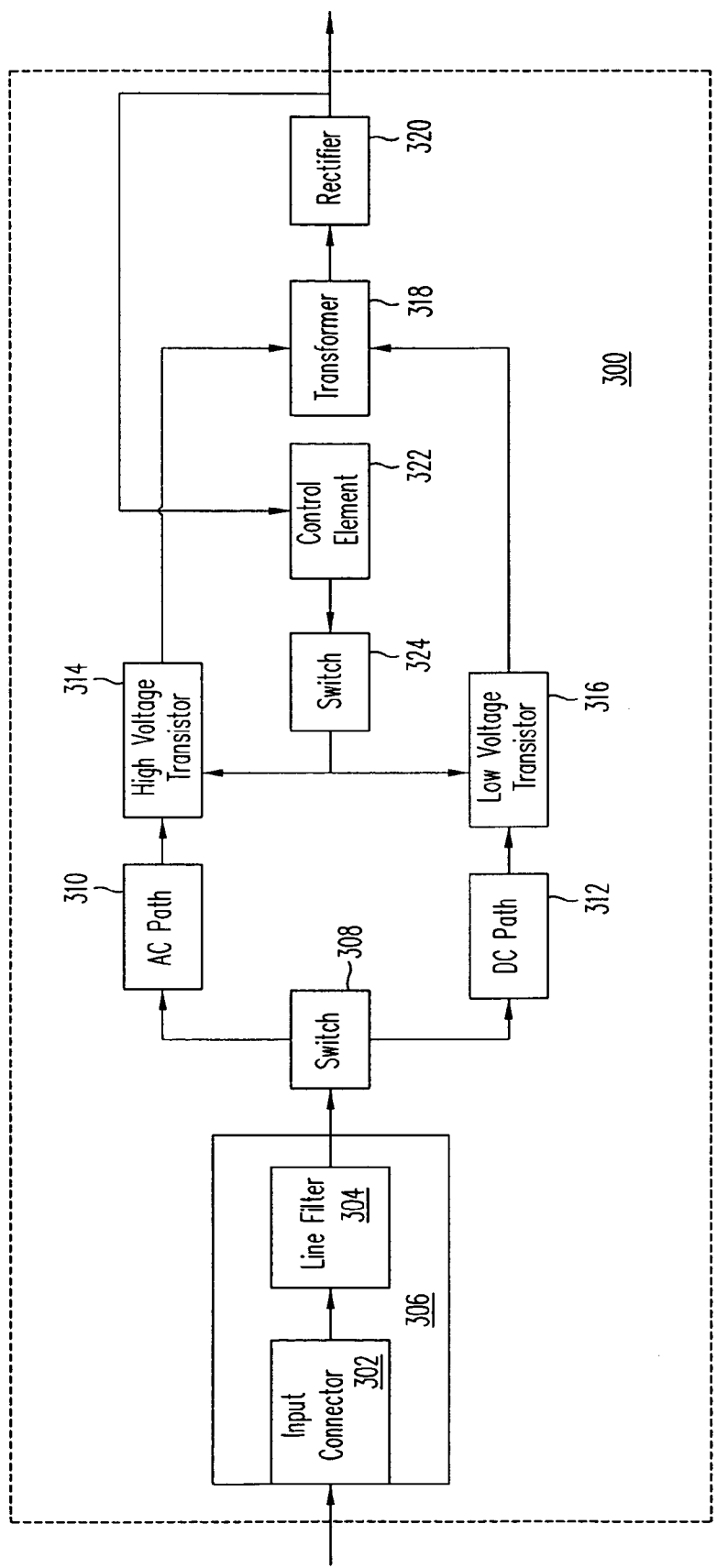
FIG. 3 illustrates a power supply at block level according to an embodiment of the present invention.

FIG. 3 illustrates a power supply at block level according to an embodiment of the present invention. In the illustrated embodiment of FIG. 3, a power supply 300 is depicted including an input connector 302 and a line filter 304 within an input stage (e.g., filtered input connector 306), and an input selector switch 308 (e.g., an electrically actuatable input switch such as a relay) selectably coupling filtered input connector 306 to either of an AC path 310 and a DC path 312. Power supply 300 of the illustrated embodiment of FIG. 3 further includes a single shared output stage (i.e., an isolation stage) including a high voltage transistor 314 coupled to AC path 310 and a low voltage transistor 316 coupled to DC path 312, a transformer 318, a rectifier 320, a control element 322, and an control selector switch 324 as shown.

While a particular number and arrangement of components has been depicted in FIG. 3, variations in the number, type, and arrangement of components are anticipated by alternative embodiments of the invention. For example, while input connector 302 has been illustrated as including a single connection point (e.g., a contact or set of contacts) to couple power supply 300 to an input voltage, input connector 302 may alternatively be implemented to include a single shared terminal coupled to a plurality of such connection points so as to reduce the number of duplicative components within power supply 300. Similarly, input selector switch 308 may be placed in alternative locations within power supply 300 and/or input selector switch 308 and control selector switch 324 may be combined into a single switch.

According to one embodiment, input selector switch 308 comprises a relay including an inductive coil to determine which of an AC input voltage and a DC input voltage is coupled to power supply 300 at input connector 302 and to selectably couple whichever input voltage type is determined to an appropriate one of AC path 310 or DC path 312. In other embodiments of the present invention however, the determination of which of an AC or DC input voltage is applied to power supply 300 may be made using any of a variety of methods or elements (e.g., using a capacitor and diode in series with a contact of input connector 302). In yet another embodiment, one or more of input selector switch 308 and control selector switch 324 comprise manually actuatable switches (e.g., a toggle switch) which determine which of an AC input voltage and a DC input voltage is coupled to power supply 300 based on user input (e.g., the physical manipulation of the switch).

In operation, either an AC or a DC voltage may be received via input connector 302. A received voltage (either AC or DC) is filtered using line filter 304 to attenuate electromagnetic noise and directed to either of AC path 310 or DC path 312. A DC voltage resulting from either of AC path 310 or DC path 312 can then be converted or transformed using an appropriate one of high voltage transistor 314 and low voltage transistor 316, transformer 318, control element 322 and rectifier 320 to a desired DC voltage. In the embodiment illustrated by FIG. 3, control element 322 is selectably coupled to an appropriate one of high voltage transistor 314 and low voltage transistor 316 using control selector switch 324, thereby limiting the number of duplicated components while avoiding the use of expensive specialized components within power supply 300.

Figure 4:
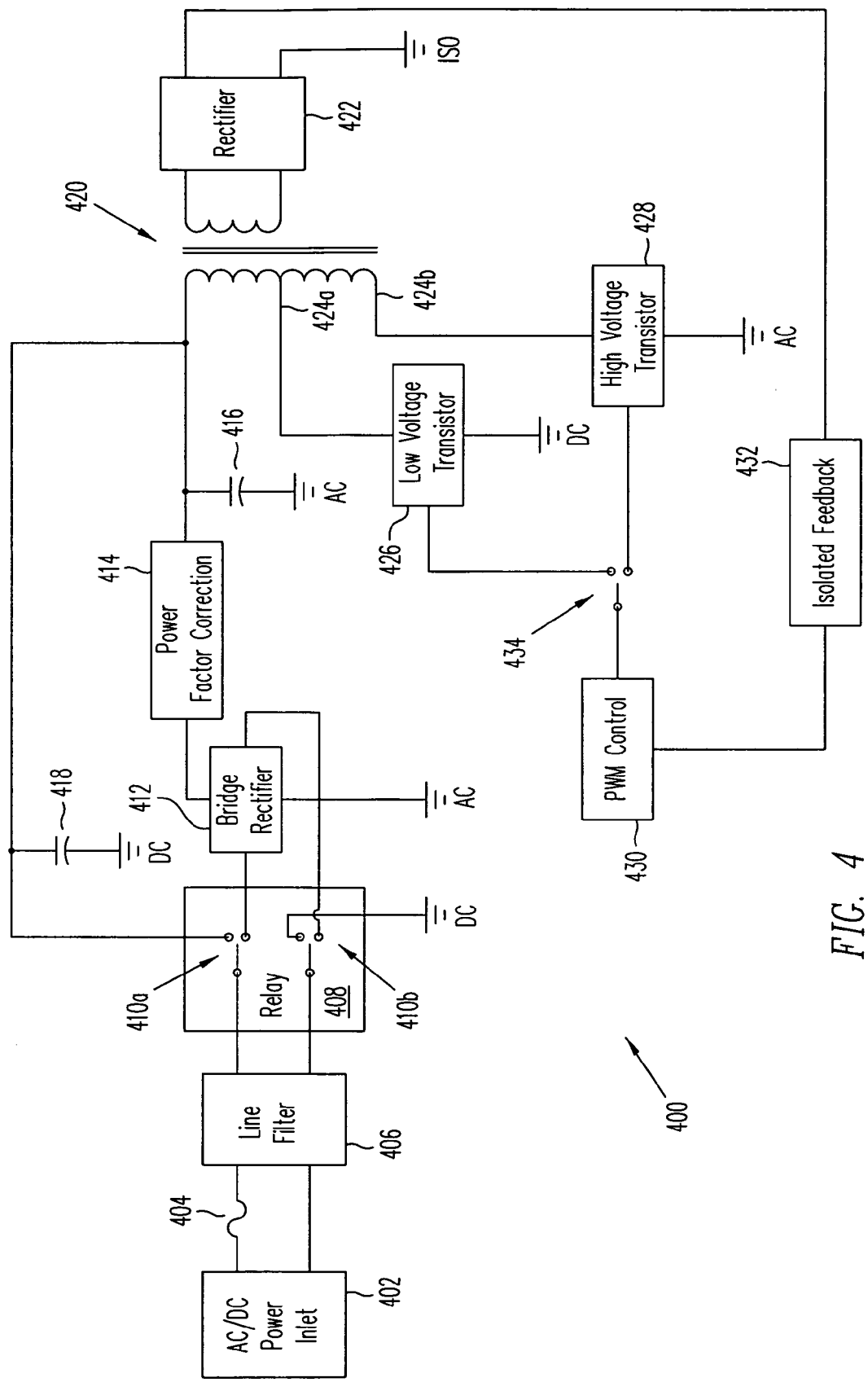
FIG. 4 illustrates a power supply having a separate return for an AC path from a DC path according to an embodiment of the present invention.

FIG. 4 illustrates a power supply having a separate return for an AC path from a DC path according to an embodiment of the present invention. An AC path within power supply 400 of the embodiment of FIG. 4 includes a rectifier (e.g., bridge rectifier 412), a power factor correction sub-circuit 414, and a bulk capacitor 416. In addition to the described AC path, power supply 400 of FIG. 4 includes a DC path including a bulk capacitor 418, an input stage including an AC/DC power inlet 402, a fuse 404, and a line filter 406, and an electrically actuatable input switch (e.g., relay 408) to determine which of an AC input voltage and a DC input voltage is coupled to power supply 400 via AC/DC power inlet 402, to couple the input stage and AC path in response to a determination that an AC input voltage is coupled to power supply 400, and to couple the input stage and DC path in response to a determination that a DC input voltage is coupled to power supply 400. Power supply 400 of the embodiment of FIG. 4 further includes a shared output stage having a transformer 420, a rectifier 422, a low voltage transistor 426, a high voltage transistor 428, a Pulse Width Modulation Control 430, and an isolated feedback sub-circuit 432 as shown. Although transformer 420 includes a first primary winding tap 424a and a second primary winding tap 424b in the illustrated embodiment, multiple primary windings can be used in place of such taps in alternative embodiments of the invention.

According to one embodiment, AC/DC power inlet 402 comprises an International Electrotechnical Committee (IEC) AC power inlet having a safety classification (e.g., "high voltage"), which is higher than a safety classification such as Safety Extra Low Voltage (SELV) or Telecommunications Network Voltage 2 (TNV2), required to safely receive DC input voltages within a desired range. In operation, either an AC or a DC voltage may be received via AC/DC power inlet 402. Damage to power supply 400 as well as any associated load is avoided using fuse 404 and a received voltage (either AC or DC) is filtered using line filter 406 to attenuate electromagnetic noise. Relay 408 is used in the illustrated embodiment to determine which of an AC input voltage and a DC input voltage is being provided to power supply 400 and to selectably couple the filtered signal to an appropriate one of bridge rectifier 412 (for received AC voltages) and transformer 420 via bulk capacitor 418 (for received DC voltages). According to one embodiment, relay 408 is an AC relay including a sensing element (e.g., an inductive coil, not illustrated) which can be used to actuate one or more switching elements (e.g., switches 410a and 410b). While bistable switches have been illustrated in the embodiment of FIG. 4, other switching elements or switching elements types (e.g., monostable switches) are contemplated by alternative embodiments of the invention.

Following full-wave rectification using bridge rectifier 412, a received AC voltage is power factor corrected using PFC sub-circuit 414 and transferred to transformer 420 via bulk capacitor 416. According to one embodiment of the present invention, bulk capacitor 416 is incorporated into PFC sub-circuit 414. As illustrated in FIG. 4, transformer 420 is coupled to a low voltage transistor 426 at first primary winding tap 424a delineating a first portion of a primary winding of transformer 420 and coupled to a high voltage transistor 428 at second primary winding tap 424b delineating a second portion of the primary winding of transformer 420. In the embodiment of FIG. 4, separate AC and DC returns are utilized to reduce voltage stress on low voltage transistor 426 and high voltage transistor 428. According to one embodiment of the present invention, the first, low-voltage portion of the primary winding of transformer 420 is associated with a 36–72 VDC input, the second, high-voltage portion of the primary winding of transformer 420 is associated with an 85 to 265 VAC input. A selection of the first primary winding tap or the second primary winding tap in the described embodiment is based on input voltage frequency as the input voltage ranges do not overlap.

Pulse width modulation control 430 drives/controls the operation of low voltage transistor 426 and high voltage transistor 428 using feedback received from rectifier 422 via isolated feedback sub-circuit 432 (e.g., an opto-isolator or the like) such that voltages received from a DC path (i.e., from relay 408 via bulk capacitor 418) are applied across the first portion of the primary winding of transformer 420 and voltages received from an AC path (i.e., from PFC sub-circuit 414 via bulk capacitor 416) are applied across the second portion of the primary winding of transformer 420. The application of a control signal from PWM control 430 to an appropriate one of low voltage transistor 426 and high voltage transistor 428 is determined using a control selector switch 434 as shown. According to one embodiment, control selector switch 434 comprises a switching element of a relay such as relay 408 described herein, in another embodiment, control selector switch 434 comprises one or more additional switching elements or contacts of relay 408, and in yet another embodiment of the present invention, control selector switch 434 comprises a solid state switching element whose actuation is controlled using a threshold detector circuit coupled to an AC detector circuit to reduce cost.

Figure 5:
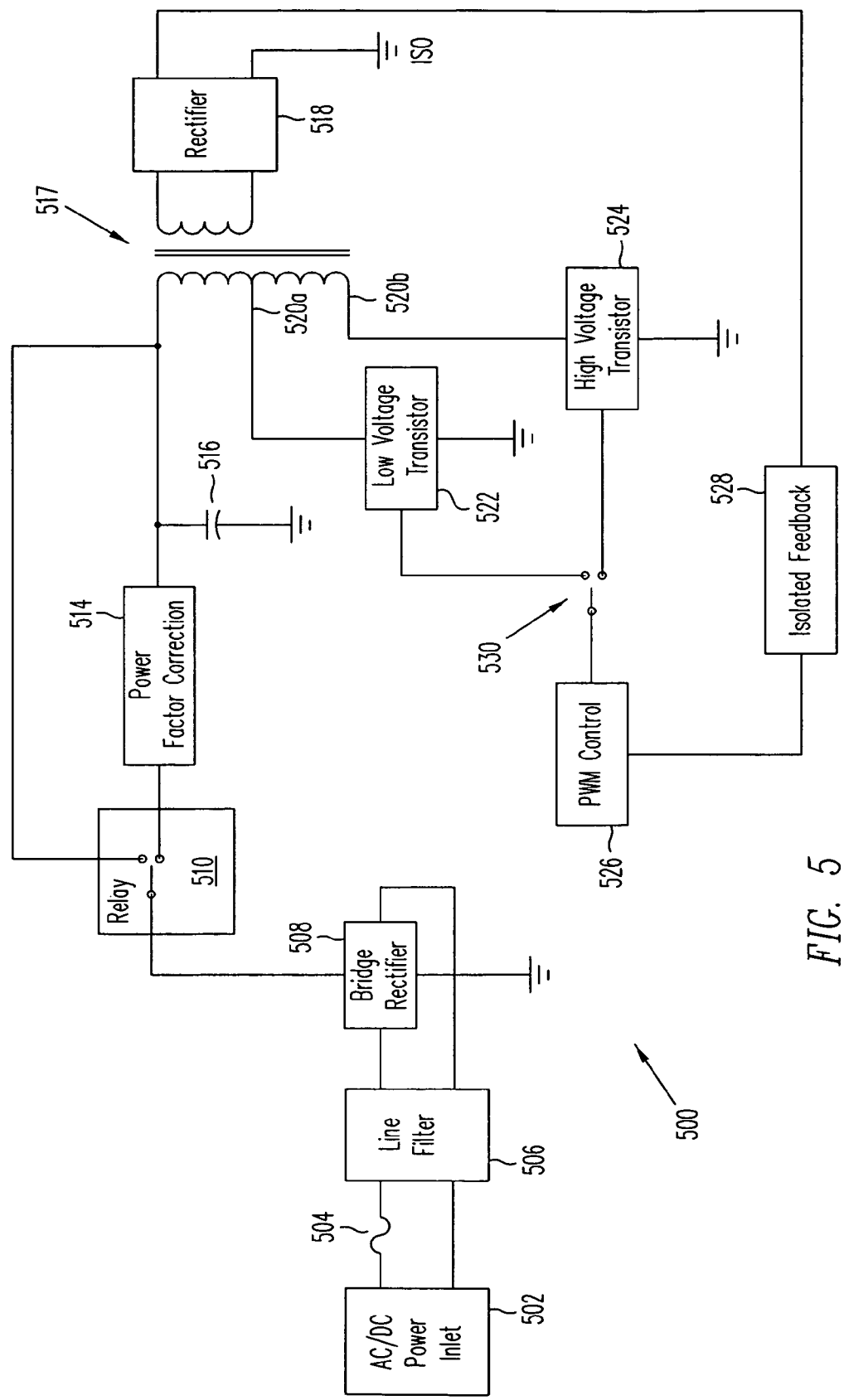
FIG. 5 illustrates a power supply having a common AC/DC path having a shared bridge rectifier according to an embodiment of the present invention.

FIG. 5 illustrates a power supply including a common AC/DC path having a shared bridge rectifier (e.g., bridge rectifier 508) according to an embodiment of the present invention. Power supply 500 of FIG. 5 is substantially similar to power supply 400 described herein with the exception of the placement of relay 510, a power factor correction sub-circuit 514 (for AC input voltages), or alternatively a short circuit (for DC input voltages) following the described common AC/DC path. As a result of the described changes however, an additional bulk capacitor (e.g., bulk capacitor 418 of FIG. 4) may be eliminated and power supply 500 is rendered insensitive to input voltage polarity. In addition to the described elements, power supply 500 of FIG. 5 includes an input stage including an AC/DC power inlet 502, a fuse 504, a line filter 506, bridge rectifier 508, and a bulk capacitor 516. According to one embodiment, bulk capacitor 516 may be implemented as an output capacitor of power factor correction sub-circuit 514.

Power supply 500 of the embodiment of FIG. 5 additionally includes an electrically actuatable input switch (e.g., relay 510) to determine which of an AC input voltage and a DC input voltage is coupled to power supply 500 via AC/DC power inlet 502, to couple the input stage and AC path in response to a determination that an AC input voltage is coupled to power supply 500, and to couple the input stage and DC path in response to a determination that a DC input voltage is coupled to power supply 500. Power supply 500 of the embodiment of FIG. 5 further includes a shared output stage such as described herein with respect to FIG. 4. For example, power supply 500 includes a shared output stage having a transformer 517, a rectifier 518, a low voltage transistor 522, a high voltage transistor 524, a Pulse Width Modulation Control 526, and an isolated feedback sub-circuit 528 as shown. Transformer 517 includes a first primary winding tap 520a and a second primary winding tap 520b. The application of a control signal from PWM control 526 to an appropriate one of low voltage transistor 522 and high voltage transistor 524 is determined using a control selector switch 530 as shown.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams and examples. It will be understood by those within the art that each block diagram component, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the present invention is intended to be limited only by the scope of the appended claims, giving full cognizance to equivalents in all respects.

What is claimed is:

1. A power supply comprising:
    an input stage comprising,
        an input connector to couple said power supply to either of an alternating current input voltage and a direct current input voltage;
    an alternating current path;
    a direct current path;
    an input selector switch to determine which of said alternating current input voltage and said direct current input voltage is coupled to said power supply, to couple said input stage to said alternating current path in response to a determination that said alternating current input voltage is coupled to said power supply, and to couple said input stage to said direct current path in response to a determination that said direct current input voltage is coupled to said power supply;
    a shared output stage to couple said power supply to a load, wherein said shared output stage is coupled to said alternating current path and said direct current path, the shared output stage further comprising:
        an output transformer;
        a low voltage transistor coupled to a first portion of said output transformer;
        a high voltage transistor coupled to a second portion of said output transformer; and
        a control element; and
    a control selector switch to couple said control element to said high voltage transistor in response to said determination that said alternating current input voltage is coupled to said power supply, and to couple said control element to said low voltage transistor in response to a determination that said direct current input voltage is coupled to said power supply.

2. The power supply of claim 1, wherein said input selector switch comprises an electrically actuatable input switch.

3. The power supply of claim 2, wherein said input selector switch comprises an alternating current relay comprising:
    an inductive coil to determine which of said alternating current input voltage and said direct current input voltage is coupled to said power supply.

4. The power supply of claim 1, further comprising:
    a shared output stage to couple said power supply to a load, wherein said shared output stage is coupled to said alternating current path and said direct current path.

5. The power supply of claim 1, wherein
    said first portion of said output transformer comprises a first primary winding of said output transformer, and
    said second portion of said output transformer comprises a second primary winding of said output transformer.

6. The power supply of claim 1, wherein said control element comprises a pulse width modulator.

7. A power supply comprising:
    an input stage comprising,
        an input connector to couple said power supply to either of an alternating current input voltage and a direct current voltage;
        an input filter coupled to said input connector to receive either of said alternating current input voltage and said direct current input voltage;
        a rectifier coupled to said input filter, and
        a bulk capacitor coupled to said rectifier;
    an alternating current path;
    a direct current path; and
    an input selector switch to determine which of said alternating current input voltage and said direct current input voltage is coupled to said power supply, to couple said input stage to said alternating current path in response to a determination that said alternating current input voltage is coupled to said power supply, and to couple said input stage to said direct current path in response to a determination that said direct current input voltage is coupled to said power supply.

8. The power supply of claim 7, wherein said alternating current path comprises,
    said rectifier coupled to said input filter,
    said bulk capacitor coupled to said rectifier, and
    a power factor correction circuit coupled to said bulk capacitor.

9. The power supply of claim 7, wherein said direct current path comprises,
    said bulk capacitor.

10. The power supply of claim 7, wherein said alternating current path comprises,
    a power factor correction circuit.

11. The power supply of claim 1, wherein said alternating current input voltage comprises an alternating current voltage of between approximately 85 and 264 volts.

12. The power supply of claim 1, wherein said direct current input voltage comprises a direct current voltage of between approximately 36 and 72 volts.

* * * * *